United States Patent
Zhang et al.

(10) Patent No.: US 12,369,163 B2
(45) Date of Patent: Jul. 22, 2025

(54) METHOD AND APPARATUS FOR ENHANCING PHYSICAL DOWNLINK CONTROL CHANNEL (PDCCH) COVERAGE

(71) Applicant: Lenovo (Beijing) Ltd., Beijing (CN)

(72) Inventors: Yuantao Zhang, Dongcheng District (CN); Yingying Li, Haidian District (CN); Zhi Yan, Xicheng District (CN); Hongmei Liu, Changping District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 392 days.

(21) Appl. No.: 17/799,478

(22) PCT Filed: Feb. 14, 2020

(86) PCT No.: PCT/CN2020/075352
§ 371 (c)(1),
(2) Date: Aug. 12, 2022

(87) PCT Pub. No.: WO2021/159500
PCT Pub. Date: Aug. 19, 2021

(65) Prior Publication Data
US 2023/0071326 A1 Mar. 9, 2023

(51) Int. Cl.
*H04L 1/1867* (2023.01)
*H04W 24/08* (2009.01)
*H04W 72/0446* (2023.01)
*H04W 72/23* (2023.01)

(52) U.S. Cl.
CPC ........... *H04W 72/23* (2023.01); *H04W 24/08* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2019/0182807 A1* | 6/2019 | Panteleev | H04L 5/0048 |
| 2019/0222400 A1 | 7/2019 | Bagheri et al. | |
| 2019/0253308 A1* | 8/2019 | Huang | H04L 43/0823 |
| 2020/0205150 A1* | 6/2020 | Cheng | H04W 72/21 |

(Continued)

FOREIGN PATENT DOCUMENTS

| | | |
|---|---|---|
| CN | 110536451 A | 12/2019 |
| WO | 2019139955 A1 | 7/2019 |

OTHER PUBLICATIONS

PCT/CN2020/075352, "International Preliminary Report on Patentability", PCT Application No. PCT/CN2020/075352, Aug. 25, 2022, 5 pages.

(Continued)

*Primary Examiner* — Minh Trang T Nguyen
(74) *Attorney, Agent, or Firm* — FIG. 1 Patents

(57) ABSTRACT

The present application is related to method and apparatus for enhancing Physical Downlink Control Channel (PDCCH) coverage. The method for enhancing PDCCH coverage comprises: receiving a search space set configuration; determining a plurality of Control Resource Set (CORESET) copies for the search space set configuration; and receiving a same Downlink Control Information (DCI) in a set of CORESET copies of the plurality of CORESET copies.

20 Claims, 3 Drawing Sheets

(56) References Cited

U.S. PATENT DOCUMENTS

2021/0352501 A1\* 11/2021 Taherzadeh Boroujeni ................ H04W 72/23
2021/0400646 A1\* 12/2021 Horiuchi ............... H04L 1/1819
2022/0124686 A1\* 4/2022 Lee ....................... H04L 5/0094
2023/0070450 A1\* 3/2023 Liu ....................... H04L 5/0007

OTHER PUBLICATIONS

PCT/CN2020/075352, "International Search Report and Written Opinion", PCT Application No. PCT/ CN2020/075352, Nov. 24, 2020, 6 pages.
Samsung, "On Search Space Design", 3GPP TSG RAN WG1 Meeting NR#3, R1-1715979, Nagoya, Japan [retrieved Aug. 24, 2022]. Retrieved from the internet <https://www.3gpp.org/ftp/TSG_RAN/WG1_RL1/TSGR1_AH/NR_AH_1709/Docs/>., Sep. 2017, 8 Pages.

\* cited by examiner

METHOD AND APPARATUS FOR ENHANCING PHYSICAL DOWNLINK CONTROL CHANNEL (PDCCH) COVERAGE

TECHNICAL FIELD

The present application generally relates to wireless communications, and more particularly, to PDCCH coverage enhancement.

BACKGROUND

The wireless communications network has grown rapidly over the years. The next generation wireless communication system 5G is an example of an emerging telecommunication standard. 5G, or new radio (NR) networks are expected to increase throughput, coverage, and robustness and reduce latency and operational and capital expenditures. In general, NR is a set of enhancements to the Long Term Evolution (LTE) mobile standard promulgated by the 3rd Generation Partnership Project (3GPP).

With the development of the 5G system, various aspects need to be studied and developed to perfect the 5G NR technology.

SUMMARY

One aspect of the present disclosure provides a method for enhancing PDCCH coverage, wherein the method comprises: receiving a search space set configuration; determining a plurality of Control Resource Set (CORESET) copies for the search space set configuration; and receiving a same Downlink Control Information (DCI) in a set of CORESET copies of the plurality of CORESET copies.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
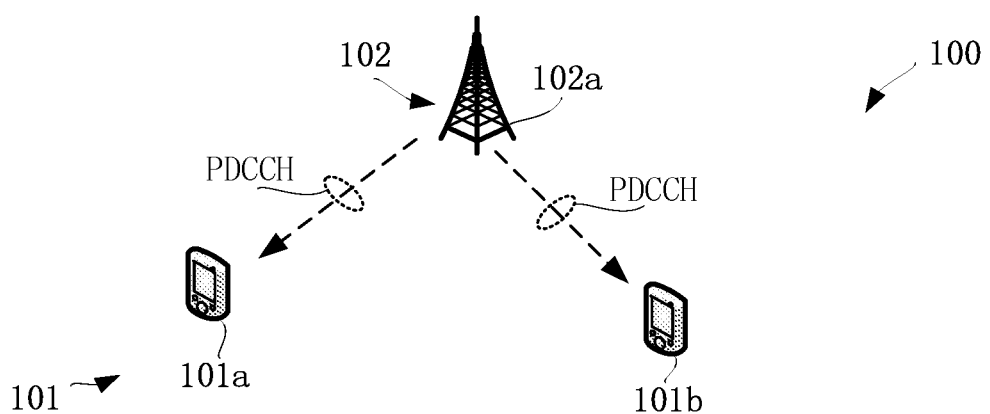
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes two UE 101 (e.g., UE 101a and 101b) and one BS 102 (e.g., BS 102a) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other. For example, BS(s) 102 may communicate directly with each other via Xn interface or X2 interface.

In some embodiments of the present application, the wireless communication system 100 is compatible with the 5G NR of the 3GPP protocol based on orthogonal frequency division multiplexing (OFDM), wherein the radio resource is partitioned into subframes, each of which may contain one or more time slots, and each slot may be comprised of various number of OFDM symbols, depending on the slot configuration. The wireless communication system may also be based on Orthogonal Frequency Division Multiple Access (OFDMA) downlink.

In 5G NR network, when there is a downlink packet to be sent from a BS to a UE, each UE gets a downlink assignment, e.g., a set of radio resources in a physical downlink shared channel (PDSCH). When a UE needs to send a packet to a BS in the uplink, the UE gets a grant from the BS that assigns a physical uplink shared channel (PUSCH) consisting of a set of uplink radio resources. The UE gets the downlink and/or uplink scheduling information from a PDCCH that is targeted specifically to that UE. In addition, broadcast control information is also sent in the PDCCH. The downlink and uplink scheduling information and the broadcast control information, carried by the PDCCH, together is referred to as DCI.

As shown in FIG. 1, PDCCHs are used for BS 102 to send DCI to UE 101a and UE 101b. A PDCCH may be transmitted in a CORESET. The CORESET is a set of contiguous or distributed physical resource blocks (PRBs) configures for PDCCH transmission. Resource elements corresponding to the same OFDM symbol may be grouped into resource element groups (REGs), and a CORESET may comprises one or multiple control channel elements (CCEs), each of which comprises multiple REGs in one or more symbols.

A PDCCH search space is a set of candidate control channels formed by CCEs at a given aggregation level, which the device is supposed to attempt to decode. A search space set is a set of search spaces, each of which is corresponding to an aggregation level. A DCI being transmitted using an aggregation level k means that k CCEs are aggregated for the transmission. A search space set is associated with a CORESET and is configured through an RRC signaling.

In one scenario, for example, an NR-Light scenario, an NR-Light UE is introduced. The NR-Light UE may refer to reduced capability NR devices, relative to Enhanced Mobile Broad Band (eMBB) UEs and Ultra Reliable Low Latency Communication (URLLC) UEs to serve three use cases such as industrial wireless sensors, video surveillances and wearables.

NR-light devices might have following complexity reduction features:
  Reduced number of UE RX/TX antennas
  UE Bandwidth reduction
  Half-Duplex-Frequency Division Duplexing (FDD)
  Relaxed UE processing time
  Relaxed UE processing capability When NR-light devices are used in the system, the impacts of the above complexity reduction features of the NR-light devices to the coverage performance for PDCCH include:
  Reduced number of receive antennas results in low receiver diversity gain;
  Lower channel bandwidth means lower supported aggregation levels, resulting in higher PDCCH code rates.

From these, the PDCCH detection performance might be deteriorated. Therefore, there is a need to enhance PDCCH coverage in such case.

One scheme for enhancing the PDCCH coverage might be to extend time domain resources for the CORESET, given the limited frequency domain resources for NR-Light UEs, and therefore allow higher aggregation level. However, this scheme causes higher PDCCH blocking rate for the normal coverage UEs and coverage enhancement UEs if they are configured with difference CORESETs which overlap in time domain, since the control channel elements for each CORESEET are not unified defined.

Another scheme is the inter-slot PDCCH repetition, which means that a DCI could be configured to repeat in the control resources of multiple PDCCH monitoring occasions, from which PDCCH is detected by the UE. However, this scheme might not allow joint channel estimation to enhance the PDCCH detection performance, and it has higher scheduling delay and might have higher power consumption.

The present application provides intra-slot DCI repetition to enhance PDCCH coverage. Compared with inter-slot PDCCH repetition, the proposed intra-slot DCI repetition has the following benefits:
  Better channel estimation performance by joint channel estimation among the CORESET copies.
  Lower scheduling latency thus lower power consumption.

It should be noted that inter-slot PDCCH repetition and intra-slot PDCCH repetition could be jointly used to improve the PDCCH coverage.

According to an aspect of the present application, monitoringSymbolsWithinSlot in the search space set configuration, as defined in 3GPP TS38.331 SearchSpace, indicating the first OFDM symbol(s) for PDCCH monitoring in the slots configured for PDCCH monitoring. The configuration could be that the search space set has "multiple copies" of the associated CORESET. PDCCH could be repeated in multiple CORESET copies of a search space set based on an indicator.

The way of determining the number of CORESET copies from monitoringSymbolsWithinSlot is as below:
  The first copy starts from the OFDM symbol corresponding to the first bit-1 in monitoringSymbolsWithinSlot and contains same number of OFDM symbols as that in the associated CORESET.
  Then the next copy starts from the OFDM symbol corresponding to the next bit-1 and contains same number of OFDM symbols as that in the CORESET, and so on.

Figure 2:
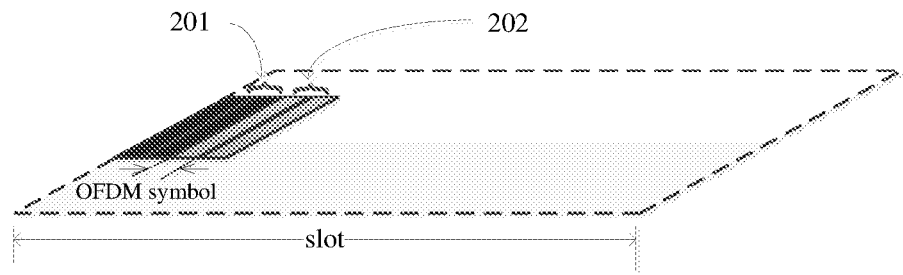
FIG. 2 illustrates an example for determining the CORESET copies for DCI repetition in accordance with some embodiments of the present application.

As an example, for a specific search space set that is associated with a 2-symobl CORESET, if monitoringSymbolsWithinSlot is configured as 0b1010 0000 0000 00, there are 2 copies of the associated CORESET. The first CORESET copy starts from the $1^{st}$ OFDM symbol in a slot and occupies 2 OFDM symbols, and the second CORESET copy starts from the $3^{rd}$ OFDM symbol and occupies another 2 symbols. FIG. 2 illustrates this example.

It should be noted such configuration of monitoringSymbolsWithinSlot was already supported by 3GPP. However, in legacy, the UE will not expect that a same DCI is transmitted from multiple CORESET copies, while the present application proposes to repeat the DCI in multiple CORESET copies to improve PDCCH coverage.

According to another aspect of the present application, a definition of "CORESET copy bundle" is introduced. One CORESET copy bundle contains a set of CORESET copies of a search space set. The CORESET copies that belong to a same CORESET copy bundle might be consecutive in time domain. A DCI is repeated in the CORESET copies of a same CORESET copy bundle. The available CORESET copies of a search space set, which are deduced from monitoringSymbolsWithinSlot as described above, are divided to be one or multiple CORESET copy bundles according to the following equation:

N_coresetCopyBundle=N_coresetCopy/N_coresetCopyPerBundle, where

Wherein: N_coresetCopy is the number of available CORESET copies,
N_coresetCopyBundle is the number of CORESET copies bundles.
N_coresetCopyPerBundle is the number of CORESET copies per bundle.

According to another aspect of the present application, an indicator is included in the search space set configuration, which explicitly or implicitly indicates if the configured CORESET copies are for DCI repetition or not. Multiple options are proposed regarding the format of the indicator as follows:

As one option, the indicator could be an explicit one (e.g., 1 bit) and indicates if DCI repetition is used. In this case, when transmitted, a DCI is repeated in all the configured CORESET copies. That is also to say, all the CORESET copies are in a same CORESET copy bundle.

As another option, the indicator is N_coresetCopyPerBundle, then N_coresetCopyBundle could be deduced from the above formula. In case N_coresetCopyperBundle is larger than 1, the DCI is repeated in the CORESET copies of the same bundle.

As yet another option, the indicator is N_coresetCopyBundle, then N_coresetCopyPerBundle could be deduced from the above formula. Similarly if N_coresetCopyperBundle is larger than 1, the DCI is repeated in the CORESET copies of the same bundle.

As yet another option, the indicator is a PDCCH intra-slot repetition number, which is actually same with N_coresetCopyBundle.

FIG. 2 illustrates one CORESET copy bundle with two CORESET copies when
monitoringSymbolsWithinSlot is configured as '0b1010 0000 0000 00',
N_coresetCopyPerBundle is configured as 2.

In this case, the CORESET duration is 2 OFDM symbols, that is, one CORESET copy occupies 2 OFDM symbols. Then the first CORESET copy 201 occupies the $1^{st}$ and $2^{nd}$ OFDM symbols and the second CORESET copy 202 occupies the $3^{rd}$ and $4^{th}$ OFDM symbols. One CORESET copy bundle is deduced and a DCI is repeated in these two CORESET copies based on configuration.

Figure 3:
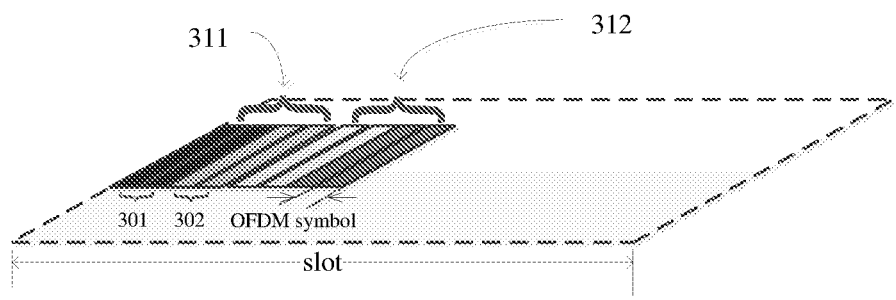
FIG. 3 illustrates an example for determining the CORESET copies for DCI repetition in accordance with some embodiments of the present application.

FIG. 3 illustrates two CORESET copy bundles when
monitoringSymbolsWithinSlot is configured as '0b1010 1010 0000 00'
N_coresetCopyPerBundle is configured as 2.

In this case, the CORESET duration is 2 OFDM symbols. As in the figure, each CORESET copy bundle contains two CORESET copies, the first CORESET bundle 311 contains the first ORESET copy 301 and the second ORESET copy 302, occupying the $1^{st}$ to $4^{th}$ OFDM symbols, and the second CORESET bundle 312 contains the third and fourth CORESET copies, occupying the $5^{th}$ to $8^{th}$ OFDM symbols. A DCI is repeated in the two CORESET copies of one CORESET copy bundle, based on gNB implementation.

Another aspect of the present application provides, as an extension, a different solution: if the associated CORESET contains 2 or more OFDM symbols, one CORESET copy could contain full or partial symbols of the associated CORESET. The principle is that in monitoringSymbolsWithinSlot, each bit of the associated CORESET copy indicates if the corresponding OFDM symbol of the CORESET copy is used for DCI transmission. For example, still for a search space set that is associated with a 2-symbol CORESET:

if monitoringSymbolsWithinSlot is configured as 0b1110 0000 0000 00, then two symbols of the first CORESET copy and the first symbol of the second CORESET copy are used for a same DCI transmission. In such case, the UE still takes the whole symbols of the second CORESET copy as for resource determination for DCI reception in each of symbols. Then the UE takes the determined resources in the first symbol of the second CORESET copy when detecting the DCI.

If monitoringSymbolsWithinSlot is configured as 0b1111 0000 0000 00, then both symbols in the first and the second CORESET copies are used for a same DCI transmission.

Figure 4:
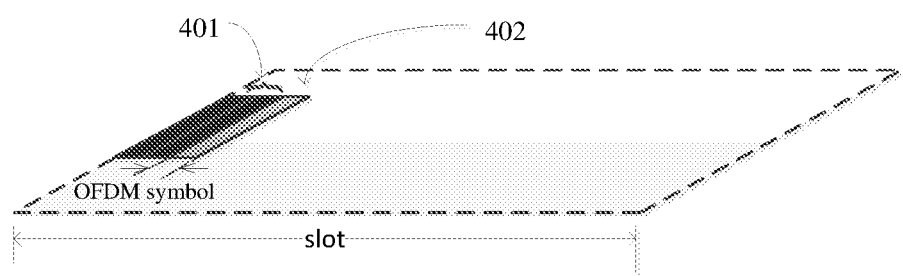
FIG. 4 illustrates an example for determining the CORESET copies for DCI repetition in accordance with some embodiments of the present application.

FIG. 4 illustrates one example for the case that a CORESET copy contains only partial symbols of the associated CORESET. Wherein:
monitoringSymbolsWithinSlot is configured as '0b1110 0000 0000 00'
N_coresetCopyPerBundle is configured as 2.

In this case, the CORESET duration is 2 OFDM symbols. Then the first CORESET copy 401 occupies the $1^{st}$ and $2^{nd}$ OFDM symbols, and the second CORESET copy 402 occupies the $3^{rd}$ and $4^{th}$ OFDM symbols, however only the first symbol in the second CORESET copy 402, i.e. the $3^{rd}$ OFDM symbol, is used for DCI transmission. One CORESET copy bundle is deduced and a DCI is repeated in these two CORESET copies based on configuration.

To implement the above solutions, the UE behavior is typically as in below:
If the configured CORESET copies are not for repetition, UE will detect the DCIs separately in each CORESET copy;
If indicates PDCCH repetition, the typical UE behavior includes determining the CCEs for each aggregation level in each CORESET copy, performing joint channel estimation, calculate the soft information in each CORESET copy, performing soft information combination and do channel decoding.

Figure 5:
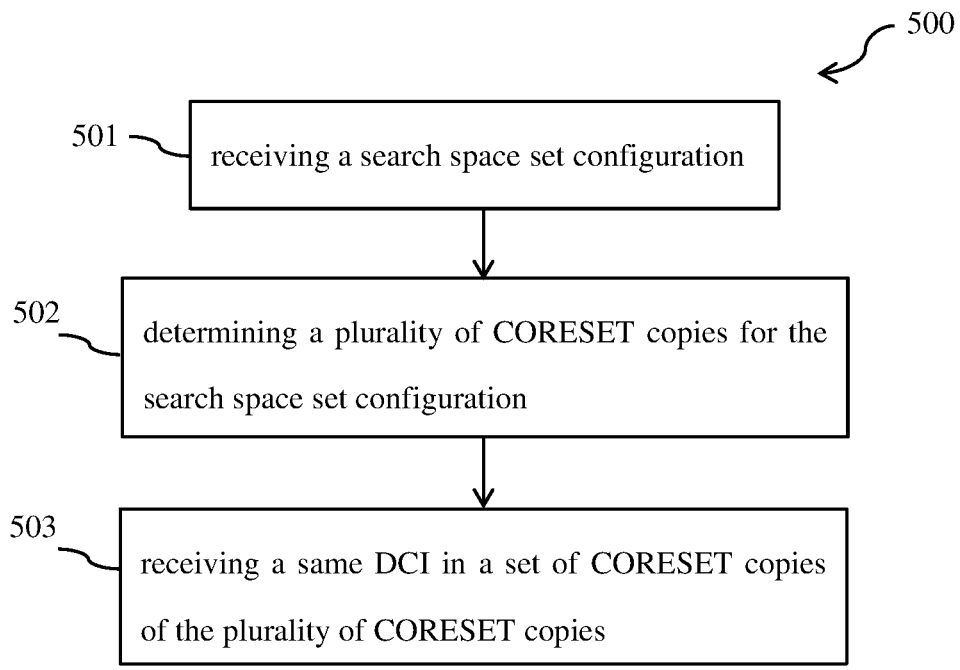
FIG. 5 illustrates a flow chart of a method for wireless communication in accordance with some embodiments of the present application.

FIG. 5 illustrates a flow chart of a method for wireless communication in accordance with some embodiments of the present application. The exemplary method 500 as shown in FIG. 5 is performed by a UE to receive PDCCH with intra-slot DCI repetition from a BS.

In the exemplary method 500, in operation 501, a UE (e.g., UE 101a as illustrated and shown in FIG. 1) receives a search space set configuration. In operation 502, the UE determines a plurality of CORESET copies for the search space set configuration. In operation 503, the UE receives a same DCI in a set of CORESET copies of the plurality of CORESET copies.

Figure 6:
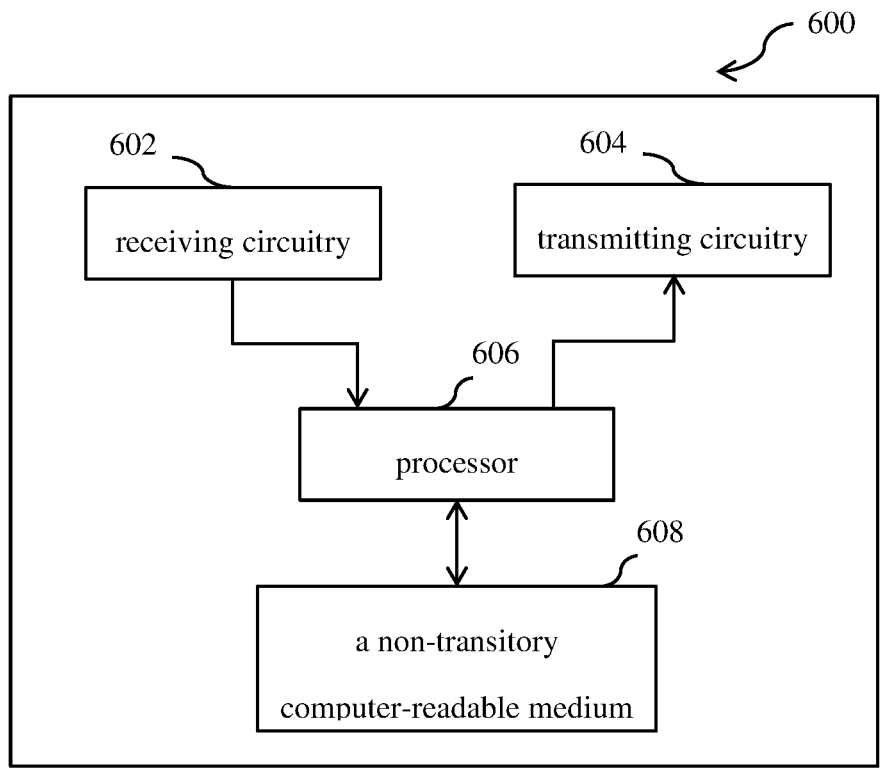
FIG. 6 illustrates a block diagram of an exemplary apparatus in accordance with some embodiments of the present application.

FIG. 6 illustrates a block diagram of an exemplary apparatus in accordance with some embodiments of the present application. Referring to FIG. 6, the apparatus 600 includes a receiving circuitry 602, a transmitting circuitry 604, a processor 606, and a non-transitory computer-readable medium 608. The processor 606 is coupled to the non-transitory computer-readable medium 608, the receiving circuitry 602, and the transmitting circuitry 604.

It is contemplated that some components are omitted in FIG. 6 for simplicity. In some embodiments, the receiving circuitry 602 and the transmitting circuitry 604 may be integrated into a single component (e.g., a transceiver).

In some embodiments, the non-transitory computer-readable medium 608 may have stored thereon computer-executable instructions to cause a processor to implement the operations with respect to UE(s) as described above. For example, upon execution of the computer-executable instructions stored in the non-transitory computer-readable medium 608, the processor 606 and the receiving circuitry 602 performs the method of FIG. 5, including: the receiving circuitry 602 receives a search space set configuration, the processor 606 determines a plurality of CORESET copies for the search space set configuration, and the receiving circuitry 602 receives a same DCI in a set of CORESET copies of the plurality of CORESET copies.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in random access memory (RAM) memory, flash memory, Read Only Memory (ROM), Erasable Programmable Read-Only memory (EPROM), Electrically Erasable Programmable read only memory (EEPROM), registers, a hard disk, a removable disk, a Compact Disc Read-Only Memory (CD-ROM), or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
    receiving a search space set configuration that indicates a plurality of control resource set (CORESET) copies; and
    receiving, from a single base station, a same downlink control information (DCI) in respective CORESET copies in a set of two or more CORESET copies of the plurality of CORESET copies.

2. The method of claim 1, wherein the plurality of CORESET copies is determined based at least in part on a monitoringSymbolsWithinSlot parameter in the search space set configuration.

3. The method of claim 2, wherein a first CORESET copy of the plurality of CORESET copies starts from an orthogonal frequency division multiplexing (OFDM) symbol corresponding to a first bit "1" in the monitoringSymbolsWithinSlot parameter and comprises a same number of OFDM symbols as a number of OFDM symbols in an associated CORESET, and wherein a next CORESET copy of the plurality of CORESET copies starts from an OFDM symbol corresponding to a first bit "1" after a previous CORESET copy and comprises the same number of OFDM symbols as the number of OFDM symbols in the associated CORESET.

4. The method of claim 1, wherein the plurality of CORESET copies are divided into at least one CORESET copy bundle comprising respective sets of two or more CORESET copies of the plurality of CORESET copies, and wherein respective same DCI is received in the respective sets of two or more CORESET copies.

5. A user equipment (UE) for wireless communication, comprising:
    at least one memory; and
    at least one processor coupled with the at least one memory and configured to cause the UE to:
        receive a search space set configuration that indicates a plurality of control resource set (CORESET) copies; and
        receive, from a single base station, a same downlink control information (DCI) in respective CORESET copies in a set of two or more CORESET copies of the plurality of CORESET copies.

6. The UE of claim 5, wherein the plurality of CORESET copies is determined based at least in part on a monitoringSymbolsWithinSlot parameter in the search space set configuration.

7. The UE of claim 6, wherein a first CORESET copy of the plurality of CORESET copies starts from an orthogonal frequency division multiplexing (OFDM) symbol corresponding to a first bit "1" in the monitoringSymbolsWithinSlot parameter and comprises a same number of OFDM symbols as a number of OFDM symbols in an associated CORESET, and wherein a next CORESET copy of the plurality of CORESET copies starts from an OFDM symbol corresponding to a first bit "1" after a previous CORESET copy and comprises the same number of OFDM symbols as the number of OFDM symbols in the associated CORESET.

8. The UE of claim 6, wherein each bit in the monitoringSymbols WithinSlot parameter indicates if a corresponding OFDM symbol of an associated CORESET copy is used for DCI transmission.

9. The UE of claim 5, wherein the plurality of CORESET copies are divided into at least one CORESET copy bundle comprising respective sets of two or more CORESET copies of the plurality of CORESET copies, and wherein respective same DCI is received in the respective sets of two or more CORESET copies.

10. The UE of claim 9, wherein the at least one CORESET copy bundle is determined based at least in part on the plurality of CORESET copies and an indicator.

11. The UE of claim 10, wherein the indicator indicates if DCI repetition is used.

12. The UE of claim 10, wherein the at least one CORESET copy bundle is a single CORESET copy bundle comprising the plurality of CORESET copies.

13. The UE of claim 10, wherein the indicator indicates a number of CORESET copy bundles of the at least one CORESET copy bundle.

14. The UE of claim 13, wherein a number of CORESET copies in one set the respective sets of two or more CORESET copies is equal to a number of CORESET copies in the plurality of CORESET copies divided by the number of CORESET copy bundles.

15. The UE of claim 10, wherein the indicator indicates a number of CORESET copies in respective CORESET copy bundles of the at least one CORESET copy bundle.

16. The UE of claim 15, wherein a number of CORESET copy bundles is equal to a number of CORESET copies in the plurality of CORESET copies divided by the number of CORESET copies in the respective CORESET copy bundles of the at least one CORESET copy bundle.

17. The UE of claim 10, wherein the indicator indicates a physical downlink control channel (PDCCH) intra-slot repetition number.

18. The UE of claim 17, wherein a number of CORESET copies in respective CORESET copy bundles of the at least one CORESET copy bundle is equal to the PDCCH intra-slot repetition number.

19. A network equipment (NE) for wireless communication, comprising:
at least one memory; and
at least one processor coupled with the at least one memory and configured to cause the NE to:
transmit a search space set configuration that indicates a plurality of control resource set (CORESET) copies; and
receive a same downlink control information (DCI) in respective CORESET copies in a set of two or more CORESET copies of the plurality of CORESET copies.

20. A processor for wireless communication, comprising:
at least one controller coupled with at least one memory and configured to cause the processor to:
receive a search space set configuration that indicates a plurality of control resource set (CORESET) copies; and
receive, from a single base station, a same downlink control information (DCI) in respective CORESET copies in a set of two or more CORESET copies of the plurality of CORESET copies.

* * * * *